United States Patent
Yamauchi

(10) Patent No.: US 10,561,973 B2
(45) Date of Patent: *Feb. 18, 2020

(54) ELEMENT ASSEMBLY AND FILTER

(71) Applicant: Koganei Corporation, Koganei-shi, Tokyo (JP)

(72) Inventor: Takeshi Yamauchi, Koganei (JP)

(73) Assignee: KOGANEI CORPORATION, Tokyo (JP)

(*) Notice: Subject to any disclaimer, the term of this patent is extended or adjusted under 35 U.S.C. 154(b) by 56 days.

This patent is subject to a terminal disclaimer.

(21) Appl. No.: 15/561,114

(22) PCT Filed: Aug. 26, 2015

(86) PCT No.: PCT/JP2015/074096
§ 371 (c)(1),
(2) Date: Sep. 25, 2017

(87) PCT Pub. No.: WO2016/151883
PCT Pub. Date: Sep. 29, 2016

(65) Prior Publication Data
US 2018/0126312 A1   May 10, 2018

(30) Foreign Application Priority Data

Mar. 26, 2015   (JP) .................................. 2015-063534

(51) Int. Cl.
*B01D 45/12*   (2006.01)
*B01D 45/08*   (2006.01)
(Continued)

(52) U.S. Cl.
CPC ......... *B01D 45/12* (2013.01); *B01D 46/0005* (2013.01); *B01D 46/0031* (2013.01);
(Continued)

(58) Field of Classification Search
CPC .... B01D 45/12; B01D 46/0049; B01D 45/08; B01D 46/4272; B01D 46/2411;
(Continued)

(56) References Cited

U.S. PATENT DOCUMENTS 2,828,831 A * 4/1958 Boretti ............... B01D 46/0012
55/330
3,208,229 A * 9/1965 Fulton ................. C03B 27/0404
55/455
(Continued)

FOREIGN PATENT DOCUMENTS

DE   2219846 A1   10/1973
DE   69833383 T2   10/2006
(Continued)

OTHER PUBLICATIONS

International Search Report for PCT Serial No. PCT/JP2015/074096 dated Nov. 16, 2015.

*Primary Examiner* — Minh Chau T Pham
(74) *Attorney, Agent, or Firm* — McCormick, Paulding & Huber PLLC

(57) ABSTRACT

A filter (10) has a port block (13) provided with: an inflow port (11) to which compressed air is supplied; and an outflow port (12) from which purified compressed air flows out. A filter container (14) is attached to the port block (13), and an element assembly (30) is disposed inside the filter element (31). The element assembly (30) has: a filter element (31); and an air guide member (41) provided inside the filter element (31). The compressed air filtered through the filter element (31) is guided to an inner surface of the air guide member (41) through a slit (46).

13 Claims, 13 Drawing Sheets

(51) Int. Cl.
*B04C 5/06* (2006.01)
*B04C 5/08* (2006.01)
*B04C 5/103* (2006.01)
*F04B 39/16* (2006.01)
*B01D 46/00* (2006.01)
*B01D 46/24* (2006.01)
*B01D 46/42* (2006.01)

(52) U.S. Cl.
CPC ...... *B01D 46/0039* (2013.01); *B01D 46/2411* (2013.01); *B01D 46/4272* (2013.01); *F04B 39/16* (2013.01)

(58) Field of Classification Search
CPC ............ B01D 46/0039; B01D 46/0005; B01D 46/0031; B04C 5/06; B04C 5/08; B04C 5/103; F04B 39/16
USPC ... 55/315, 318, 322, 482, 486, 461, DIG. 17
See application file for complete search history.

(56) References Cited

U.S. PATENT DOCUMENTS

| | | | | |
|---|---|---|---|---|
| 3,771,295 A * | 11/1973 | Wheeler, Jr. | ........... | B01D 45/16 55/424 |
| 5,119,640 A * | 6/1992 | Conrad | .................... | B01D 7/02 165/111 |
| 5,228,890 A * | 7/1993 | Soderlund | ................. | B04C 1/00 55/337 |
| 5,591,243 A * | 1/1997 | Colussi | ................. | B01D 45/08 55/321 |
| 5,846,271 A * | 12/1998 | Flynn | ................... | B01D 50/002 55/315 |
| 6,032,804 A * | 3/2000 | Paulson | ................. | B01D 45/12 209/143 |
| 6,093,227 A * | 7/2000 | Benasutti | ............... | B01D 45/06 55/332 |
| 6,440,201 B1 * | 8/2002 | Billiet | ................ | B01D 46/0004 55/476 |
| 6,726,752 B2 * | 4/2004 | Chen | ...................... | B01D 53/26 55/319 |
| 7,531,018 B2 * | 5/2009 | Becker | ................... | B01D 45/08 55/337 |
| 7,766,989 B2 * | 8/2010 | Lane | ...................... | B01D 45/06 55/424 |
| 2002/0069626 A1 | 6/2002 | Fiacco | | |
| 2014/0069521 A1 * | 3/2014 | Sakai | .................... | F17C 13/002 137/315.01 |
| 2014/0075898 A1 * | 3/2014 | Sakai | .................... | B01D 45/12 55/461 |
| 2014/0083299 A1 | 3/2014 | Yamase et al. | | |
| 2014/0124054 A1 | 5/2014 | Yamase et al. | | |
| 2015/0322858 A1 * | 11/2015 | Boateng | ............... | F02C 7/055 55/306 |
| 2018/0117511 A1 * | 5/2018 | Yamauchi | ............. | B01D 45/12 |

FOREIGN PATENT DOCUMENTS

| | | |
|---|---|---|
| DE | 112011105229 T5 | 2/2014 |
| EP | 1 155 724 A1 | 11/2001 |
| JP | H07-204440 A | 8/1995 |
| JP | 2012-020242 A | 2/2012 |
| JP | 2012-232281 A | 11/2012 |
| JP | 2013-000659 A | 1/2013 |

* cited by examiner

ELEMENT ASSEMBLY AND FILTER

CROSS-REFERENCE TO RELATED APPLICATIONS

This application is a National Stage application of International Patent Application No. PCT/JP2015/074096, filed on Aug. 26, 2015, which claims priority to Japanese Patent Application No. 2015-063534, filed on Mar. 26, 2015, each of which is hereby incorporated by reference in its entirety.

TECHNICAL FIELD

The present invention relates to an element assembly and a filter utilized for removing foreign matters, such as liquid and dust, contained in compressed air to be supplied to a pneumatic device.

BACKGROUND ART

Compressed air is supplied from a pneumatic source to a pneumatic device, such as a pneumatic cylinder, through a pneumatic line, such as piping or a hose. The pneumatic source and the pneumatic device are connected to each other through the pneumatic line, thereby forming a pneumatic circuit. Compressed air to be supplied from the pneumatic source to the pneumatic device is regarded as "air-to-be-treated", and the pneumatic circuit is provided with a filter for removing foreign matters, such as liquid, oil, and dust, contained in the air-to-be-treated.

Size of foreign matters to be removed depends on conditions such as an inner diameter of an air passage hole on a filter element. A filter has a form such as an air filter, a mist filter, or a micro-mist filter, depending on the size of the foreign matters to be removed.

This type of filter comprises a filter container and a cylindrical filter element disposed inside the filter container. The filter container is detachably attached to a port block. According to a filter described in Japanese Patent Application Laid-Open Publication No. 2012-232281, air-to-be-treated is supplied to an outside of a filter element of the filter, is filtered through the filter element, and flows from inside of the filter element to outside of the filter. In this filter, a deflector and a baffle are attached to respective ends of the filter element, and the filter element is attached to an opening portion of a housing by the deflector.

SUMMARY OF THE INVENTION

As described in Japanese Patent Application Laid-Open Publication No. 2012-232281, in the filter designed to filter air-to-be-treated by sending the air from outside of the filter element to inside the filter element, foreign matters, such as liquid and oil, filtered through the filter element and having reached an inner surface of the filter element agglomerate on this inner surface, and form into droplets. The droplets move downward along the inner surface of the filter element, and are accumulated in a storage chamber.

However, a sudden change, or more specifically, a sudden increase in an amount of consumption of the compressed air on a secondary-side of the filter causes a flow rate of air to increase sharply. This may cause the droplets adhered to the inner surface of the filter element to detach from the filter element and be scattered by the compressed air, and thus, the droplets may be mixed with the secondary-side air flowing toward an outflow port. Certain types of filters have a communication pipe portion projecting into an upper end portion of the filter element so that the secondary-side air is guided toward the outflow port. In such a filter, the droplets detached from the filter element and scattered have a high possibility of being mixed with the compressed air flowing toward the outflow port. If the droplets are mixed with the compressed air, efficiency of removing foreign matters cannot be improved.

An object of the present invention is to provide a filter that removes foreign matters with high efficiency.

According to one aspect of the present invention, there is provided a filter for removing foreign matters contained in compressed air to purify the compressed air, the filter comprising: a port block provided with: an inflow port to which compressed air is supplied; and an outflow port from which purified compressed air flows out; a filter container attached to the port block, the filter container and the port block collectively forming a housing chamber; and an element assembly disposed inside the housing chamber, wherein the element assembly includes: an upper holder; a lower holder; a filter element provided between the upper holder and the lower holder; and an air guide member provided between the upper holder and the lower holder, the air guide member extending along an inner peripheral surface of the filter element, wherein the air guide member is provided with a slit that tilts a flow of the compressed air filtered through the filter element toward a circumferential direction of the air guide member so that the compressed air is guided to an inner surface of the air guide member.

According to another aspect of the present invention, there is provided an element assembly utilized in a filter that removes foreign matters contained in compressed air to purify the compressed air, the element assembly comprising: an upper holder; a lower holder; a filter element provided between the upper holder and the lower holder; and an air guide member provided between the upper holder and the lower holder, the air guide member extending along an inner peripheral surface of the filter element, wherein the air guide member is provided with a slit that tilts a flow of the compressed air filtered through the filter element toward a circumferential direction of the air guide member so that the compressed air is guided to an inner surface of the air guide member.

The element assembly has the filter element and the air guide member provided inside the filter element. The compressed air filtered through the filter element flows through the slit and is jetted toward the inner surface of the air guide member. Liquid and oil contained in the air-to-be-treated collide and agglomerate as they are filtered through the filter element, and grow into droplets of certain sizes. The droplets grown into certain sizes flow downward along an inner wall of the filter element, and are accumulated in a storage chamber. Some of the droplets detach from the inner wall of the filter element along with the flow of the compressed air, collide against an outer wall of the air guide member, and adhere to this outer wall. The droplets adhered to the outer wall flow downward toward the storage chamber by their own weight. Additionally, the droplets flowed through the slit formed on the air guide member flow in a circumferential direction of the air guide member, collide against the inner surface of the air guide member, adhere to this inner surface, and flow downward toward the storage chamber by their own weight. No droplets, therefore, flow toward the outflow port. Thus, efficiency of removing foreign matters, such as liquid, oil, and dust, can be improved.

DETAILED DESCRIPTION OF PREFERRED EMBODIMENTS

Figure 1:
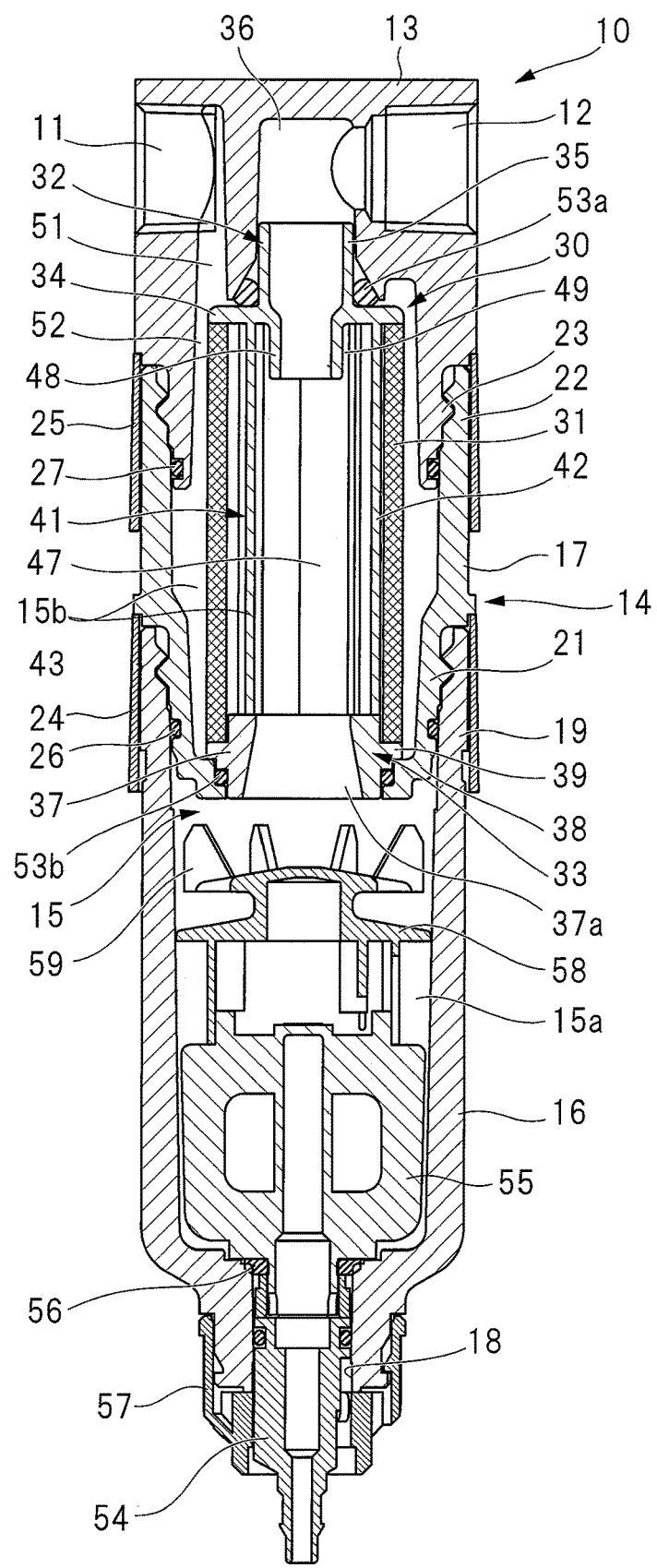
FIG. 1 is a longitudinal sectional view showing a filter according to an embodiment of the present invention.

Hereinafter, embodiments of the present invention will be described in detail with reference to the drawings. In the drawings, components that are the same as each other are denoted by the same reference numerals.

A filter 10 shown in FIG. 1 has a port block 13 provided with an inflow port 11 and an outflow port 12. The inflow port 11 is connected to an air guide member, such as piping or a hose, and air-to-be-treated is supplied to the filter 10 through the air guide member. The outflow port 12 is connected to an air guide member, such as piping or a hose, and purified compressed air flows out through the outflow port 12.

The filter 10 has a filter container 14 detachably attached to a lower end portion of the port block 13. The filter 10 is used with the port block 13 located on an upper side of the filter 10, and with the filter container 14 located on a lower side of the filter 10. The port block 13 of the filter 10 is mounted to a wall surface (not shown), or the like, by an attachment (not shown). A vertical direction of each of the components described in this specification is based on the position of the filter 10 when in use.

The filter container 14 is provided with a housing chamber 15. The filter container 14 shown in FIG. 1 has a first container 16 and a second container 17. The first container 16 has a lower end portion provided with a liquid discharge hole 18, and an upper end portion provided with a female screw portion 19. The second container 17 has a lower end portion provided with a male screw portion 21 that is screwed to the female screw portion 19. The second container 17 further has an upper end portion provided with a female screw portion 22, and the port block 13 is provided with a male screw portion 23 that is screwed to the female screw portion 22. Therefore, rotating the first container 16 relative to the second container 17 allows the first container 16 to be attached to or detached from the second container 17. Rotating the second container 17 relative to the port block 13 allows the filter container 14 to be attached to or detached from the port block 13. However, as another type of the filter container 14, the first container 16 and the second container 17 may be integral with each other.

An annular lock member 24 is attached to an outside of the upper end portion of the first container 16 and is movable in the vertical direction. Engaging the lock member 24 with the second container 17 prevents the first container 16 from rotating relative to the second container 17. Similarly, an annular lock member 25 is attached to an outside of the upper end portion of the second container 17 and is movable in the vertical direction. Engaging the lock member 25 with the port block 13 prevents the second container 17 from rotating relative to the port block 13. A seal member 26 seals a gap between the first container 16 and the second container 17, and a seal member 27 seals a gap between the second container 17 and the port block 13.

The housing chamber 15 is partitioned into a storage chamber 15a inside the first container 16 and a filter chamber 15b inside the second container 17. An element assembly 30 is disposed inside the filter chamber 15b. The element assembly 30 includes a cylindrical filter element 31 having filtering and agglomerating functions, an upper holder 32 fixed to an upper end portion of the filter element 31, and a lower holder 33 fixed to a lower end portion of the filter element 31. The filter element 31 is provided between the upper holder 32 and the lower holder 33.

The upper holder 32 has a flange portion 34, and an upper end surface of the filter element 31 abuts on the flange portion 34. A discharge pipe 35 is provided on the flange portion 34 and projects upward. A communication hole 36 is formed on the port block 13, and the discharge pipe 35 is fitted in the communication hole 36 to be attached to the port block 13. The discharge pipe 35 and the outflow port 12 communicate with each other through the communication hole 36. The lower holder 33 has an annular portion 37, and is attached to an annular supporting portion 38 provided on the second container 17. The annular portion 37 is provided with a liquid discharge hole 37a that communicates with the storage chamber 15a. The liquid discharge hole 37a is formed by a tapered surface with its inner diameter increasing toward a lower end portion of the annular portion 37. A flange portion 39 is provided on the annular portion 37 and projects radially outward from the annular portion 37. A lower end surface of the filter element 31 abuts on the flange portion 39.

Figure 2:
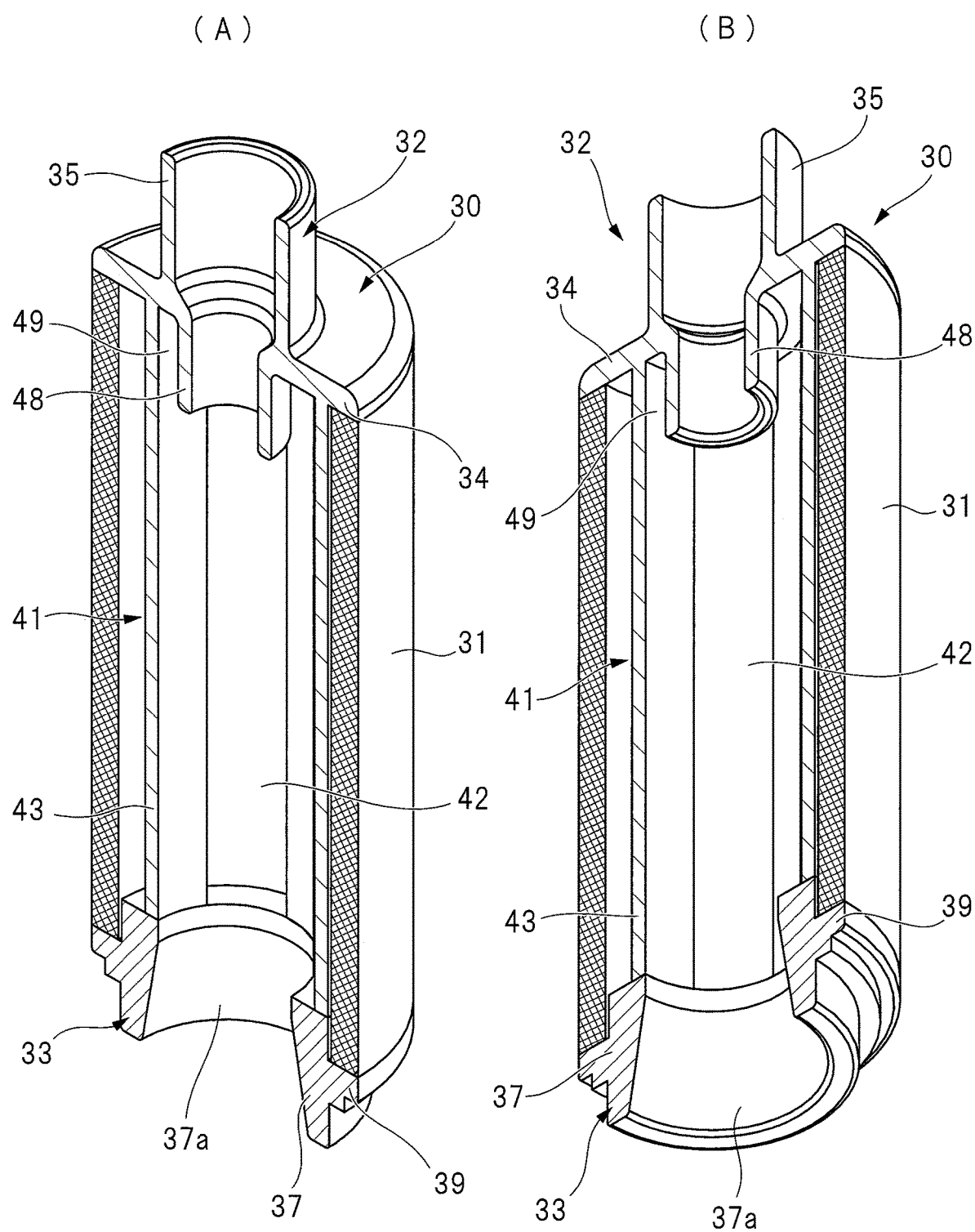
FIG. 2(A) is a perspective view showing a longitudinally-cut portion of the element assembly of the filter of FIG. 1, as seen from above.
FIG. 2(B) is a perspective view showing the longitudinally-cut portion of the element assembly of the filter of FIG. 2(A), as seen from below.
Figure 3:
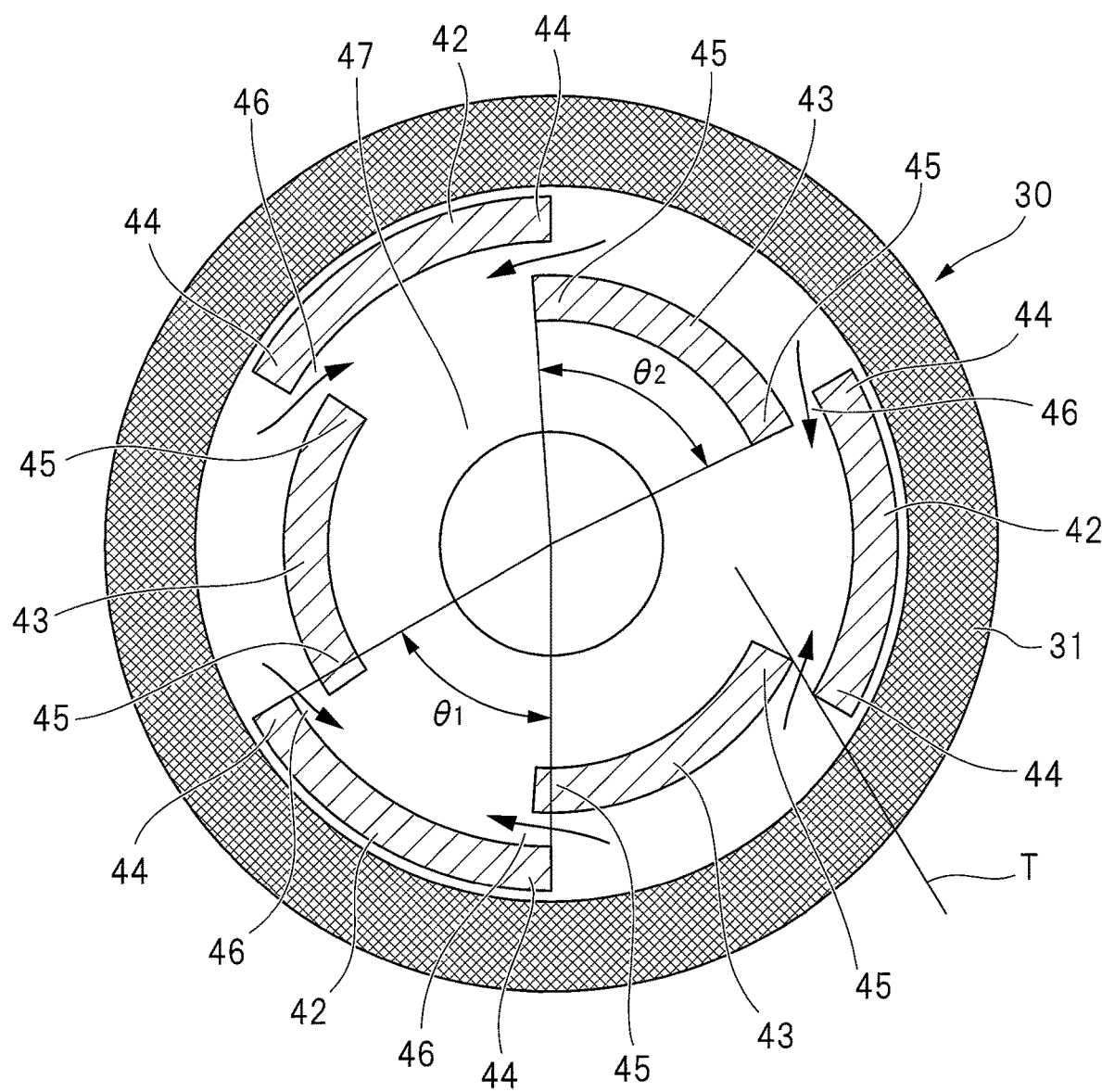
FIG. 3 is a lateral sectional view of the element assembly of FIG. 1.
Figure 4:
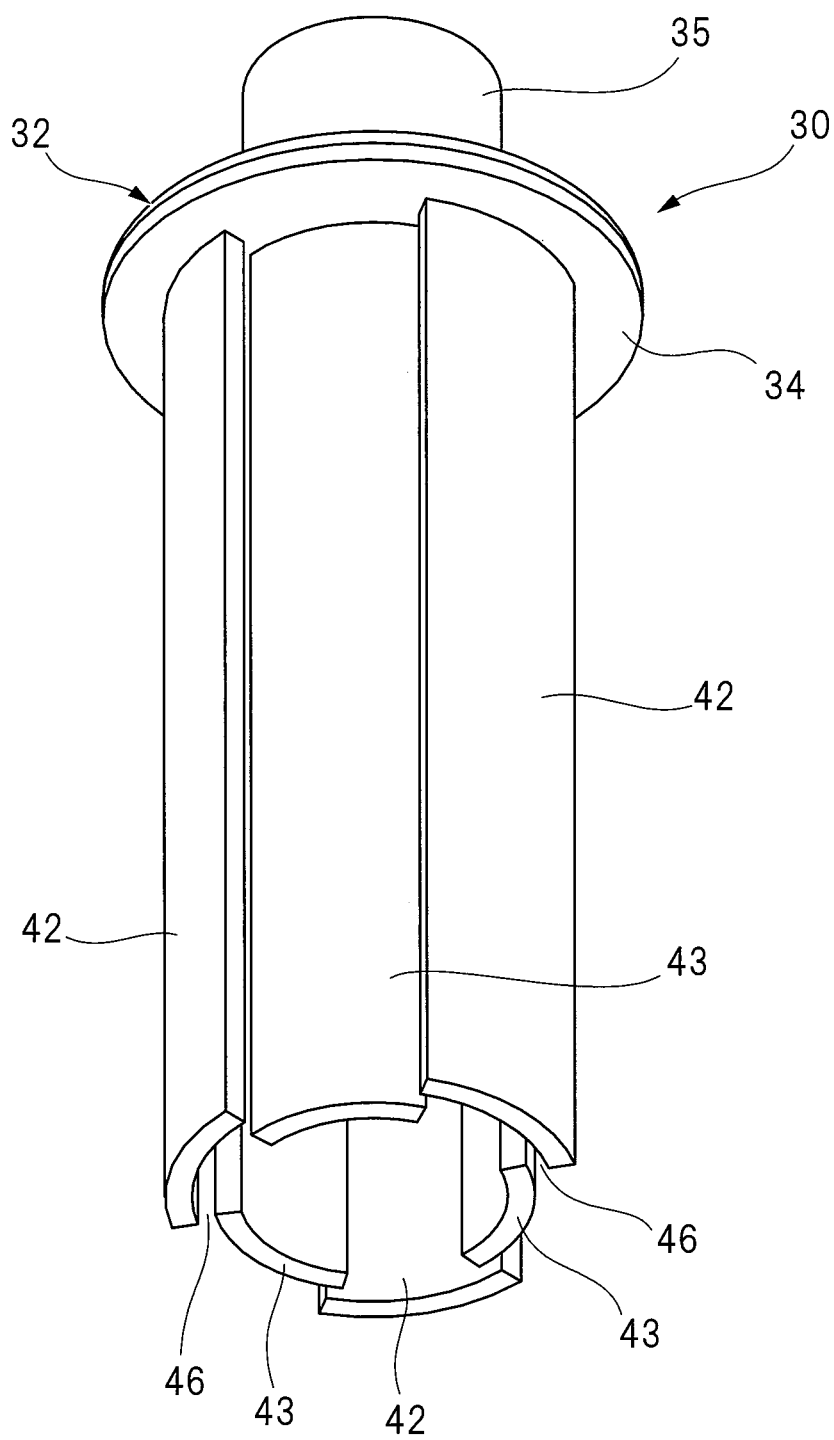
FIG. 4 is a perspective view showing an air guide member and an upper holder of FIG. 1.

An air guide member 41 is provided between the upper holder 32 and the lower holder 33, and is located inside the filter element 31. As shown in FIGS. 2 to 4, the air guide member 41 has a plurality of outer blades 42 and a plurality of inner blades 43. The outer blades 42 are positioned in a circumferential direction of the air guide member 41 so as to be spaced apart from each other. The inner blades 43 are positioned in the circumferential direction of the air guide member 41 so as to be spaced apart from each other, the inner blades 43 being positioned radially inside relative to the outer blades 42. The outer blades 42 and the inner blades 43 are integrally provided on the upper holder 32.

The element assembly shown in FIG. 3 has three outer blades 42 and three inner blades 43. An angle subtended by a circumference of each outer blade 42 is denoted by an angle $\theta 1$, and an angle subtended by a circumference of each inner blade 43 is denoted by an angle $\theta 2$. The outer blades 42 and the inner blades 43 extend in the circumferential direction of the air guide member 41, and each angle $\theta 1$ and each angle $\theta 2$ is equal to or greater than 60 degrees. Each outer blade 42 has outer end portions 44 in the circumferential direction of the outer blade 42, and each inner blade 43 has inner end portions 45 in the circumferential direction of the inner blade 43. A slit 46 is formed between each outer end portion 44 of the outer blade 42 and the inner end portion 45 of the inner blade 43 adjacent to said outer blade 42. Each outer end portion 44 overlaps the inner end portion 45 adjacent to said outer end portion 44 in the circumferential direction of the air guide member 41, with the slit 46 therebetween; therefore, each slit 46 is opened toward the circumferential direction of the air guide member 41. A tangent line from an edge of each outer end portion 44 extending through an edge of the respective inner end portion 45 is denoted by "T". The tangent line "T" does not pass through a center of the filter chamber 15b, that is, a center of the air guide member 41. The air guide member 41 shown in FIG. 3 comprises three outer blades 42 and three inner blades 43, thereby forming six slits 46 on the air guide member 41. However, the numbers of outer blades 42 and inner blades 43 that collectively constitute the air guide member 41 are not limited to three, and may be of any desired number.

As described above, the element assembly 30 comprises: the upper holder 32, the lower holder 33, the filter element 31 provided between the upper holder 32 and the lower holder 33, and the air guide member 41 provided inside the filter element 31. These members are assembled together to form the element assembly 30. As shown in FIG. 1, the element assembly 30 is disposed inside the filter chamber 15b partitioned by the port block 13 and the second container 17. A communication passage 51 is formed in the port block 13 and communicates with the inflow port 11. The communication passage 51 communicates with an inflow space 52 formed outside the element assembly 30. A seal member 53a seals a gap between the upper holder 32 and the port block 13. A seal member 53b seals a gap between the lower holder 33 and the annular supporting portion 38.

Air-to-be-treated flowed from the inflow port 11 to the inflow space 52 is filtered through the filter element 31. Liquid and oil contained in the air-to-be-treated collide and agglomerate as they are filtered through the filter element 31, and grow into droplets of certain sizes. The droplets also contain fine dust filtered through the filter element 31. The grown droplets reach an inner peripheral surface of the filter element 31, and flow downward along this inner peripheral surface by their own weight. Some of these droplets detach from the inner peripheral surface of the filter element while flowing downward, collide against and adhere to an outer wall of the air guide member 41, move downward along the outer wall of the air guide member 41, and flow downward toward the storage chamber 15a. Additionally, some of the droplets enter an inner space 47 through the slits 46, and do not collide against the outer wall of the air guide member 41.

The compressed air filtered through the filter element 31 enters a gap between the air guide member 41 and the filter element 31, and flows into the inner space 47 of the air guide member 41 through the slits 46. As indicated by arrows in FIG. 3, the compressed air flows in the circumferential direction of the air guide member 41 into the inner space 47 through the slits 46, and does not flow directly toward a center of the inner space 47. As a result, the compressed air flowed into the inner space 47 through the slits 46 is jetted toward inner surfaces of the inner blades 43.

The slits 46 are formed so that two slits 46 face each other on an inside of each of the outer blades 42. The compressed air flowed through these two slits 46 facing each other flow in the circumferential direction of the air guide member 41 and collide with each other near a center of the inside of each outer blade 42. These two flows of compressed air colliding with each other cause direction of flow to change from the circumferential direction to a radial direction of the air guide member 41, thereby directing the air toward the center of the air guide member 41. The area near the center of the inside of each outer blade 42, where the two flows of the compressed air collide with each other, is a drift area. Each drift area is formed at a center of an inner wall of each outer blade 42 in an axial direction of the outer blade 42. The droplets accumulated in the drift area grow larger, and therefore swiftly flow downward along the inner walls of the outer blades 42 by their own weight.

Each outer blade 42 may be provided with a groove at the center of the inner wall of the outer blade 42, each groove extending in the axial direction of the outer blade 42 so as to help the droplets stay and grow in the drift area.

In this manner, most of the droplets filtered through the filter element 31 and grown in size collide against and adhere to the outer wall of the air guide member, and flow downward. Droplets that did not collide against the outer wall of the air guide member flow into the inner space 47 through the slits 46, are jetted toward inner surfaces of the outer blades 42 by the compressed air, and adhere to these inner surfaces of the outer blades 42. In other words, liquid and oil that did not collide against the outer wall of the air guide member 41 adhere to the outer blades 42 functioning as the air guide member 41, without being jetted directly toward the center of the inner space 47.

Droplets adhered to an outside of the air guide member 41 and the inner surfaces of the outer blades 42 have certain sizes such that the droplets can be prevented from moving toward a center portion of the inner space 47, even if a sudden change in flow rate of the compressed air occurs. This prevents foreign matters from flowing out from the discharge pipe 35 to the outflow port 12, and thus, efficiency of removal of foreign matters by the filter 10 can be improved.

A small-diameter guide pipe 48 is provided on the flange portion 34 of the upper holder 32, and projects downward. The small-diameter guide pipe 48 projects radially inward relative to the air guide member 41. A cutoff space 49 is formed between the small-diameter guide pipe 48 and an upper end portion of the air guide member 41, with its opening facing downward. The cutoff space 49 prevents the droplets adhered to the inner blades 43 or the inner surfaces of the outer blades 42 from moving along these surfaces into the small-diameter guide pipe 48 and discharge pipe 35. No foreign matters, therefore, are mixed with the compressed air flowing from the inner space 47 toward the discharge pipe 35.

The droplets adhered to the outer surface of the air guide member 41 and the inner surfaces of the outer blades 42 move downward by their own weight, and drop through the liquid discharge hole 37a into the storage chamber 15a. A discharge pipe 54 is fitted in the liquid discharge hole 18, and foreign matters, such as liquid, accumulated in the storage chamber 15a are discharged to the outside through the discharge pipe 54. A leg portion 55 composed of four plate-like members is disposed inside the storage chamber 15a. The four plate-like members extend radially from a radial center of the leg portion 55. The leg portion 55 is provided with a seal member 56 that seals the liquid discharge hole 18. An operation knob 57 is rotatably attached to a lower end portion of the filter container 14, and is engaged with the discharge pipe 54. By rotating the operation knob 57, the discharge pipe 54 can be moved up or down. When the discharge pipe 54 is moved up by the operation knob 57, the first container 16 is switched from being sealed by the seal member 56 to being opened. In this manner, foreign matters, such as liquid, in the storage chamber 15a is discharged to the outside through the discharge pipe 54.

A baffle plate 58 is disposed on top of the leg portion 55 so that the baffle plate 58 faces the liquid discharge hole 37a. A plurality of fins 59 are provided on outer peripheral portions of the baffle plate 58. Each of the fins 59 project upward and extend in a radial direction of the baffle plate 58. The droplets dropped into the storage chamber 15a through the liquid discharge hole 37a are guided toward an inner peripheral surface of the first container 16 by the fins 59, and are accumulated in a lower portion of the storage chamber 15a. The filter container 14 is made of transparent resin, and allows an operator to visually confirm the amount of liquid accumulated in the storage chamber 15a from the outside. When an increase in the amount of liquid is visually confirmed, the operator operates the operation knob 57 to discharge foreign matters, such as liquid, from the storage chamber 15a to the outside.

Figure 5:
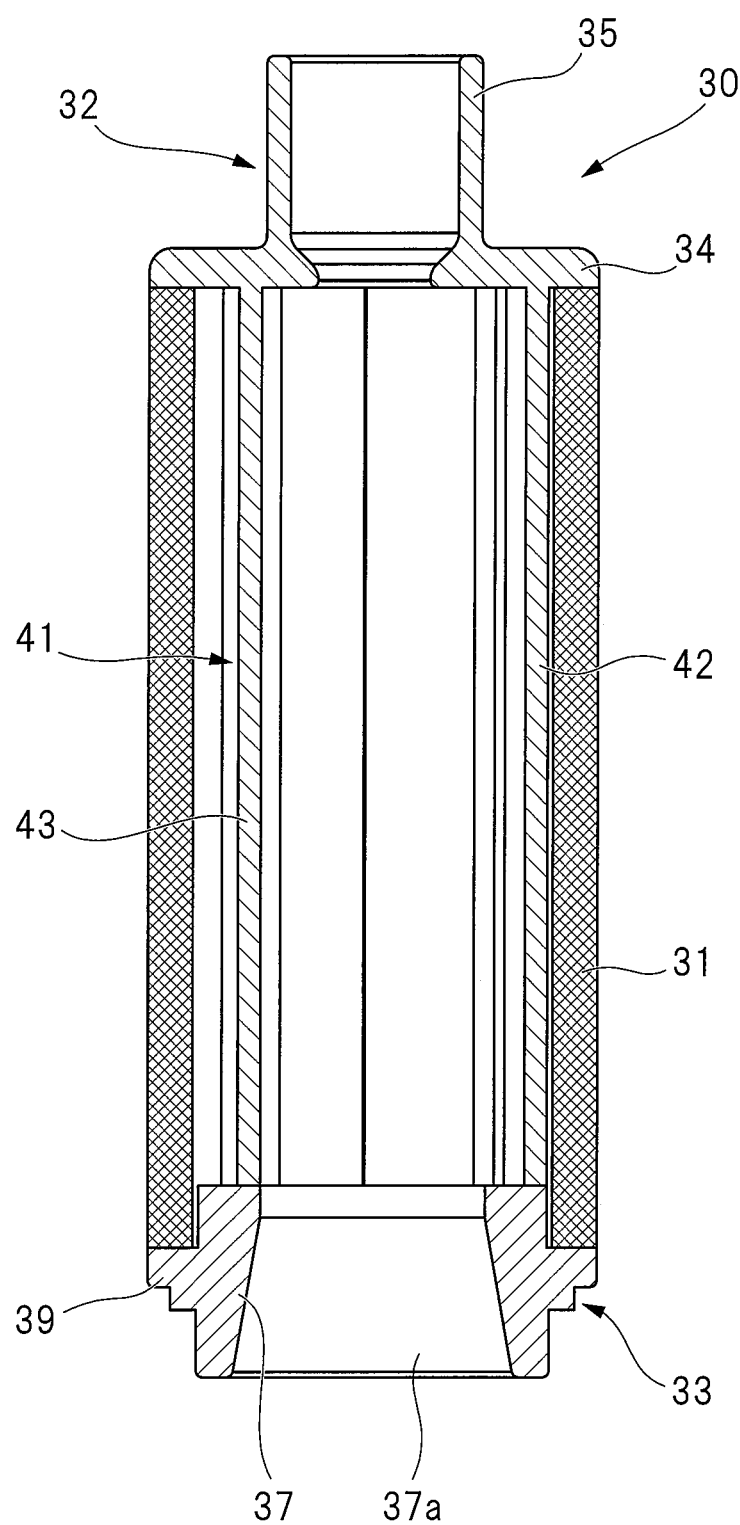
FIG. 5 is a longitudinal sectional view showing a variant of the element assembly.

FIG. 5 is a longitudinal sectional view showing a variant of the element assembly 30. FIG. 6(A) is a perspective view showing a longitudinally-cut portion of the element assembly 30 of FIG. 5, as seen from above; FIG. 6(B) is a perspective view showing the longitudinally-cut portion of the element assembly 30 of FIG. 6(A), as seen from below.

Figure 6:
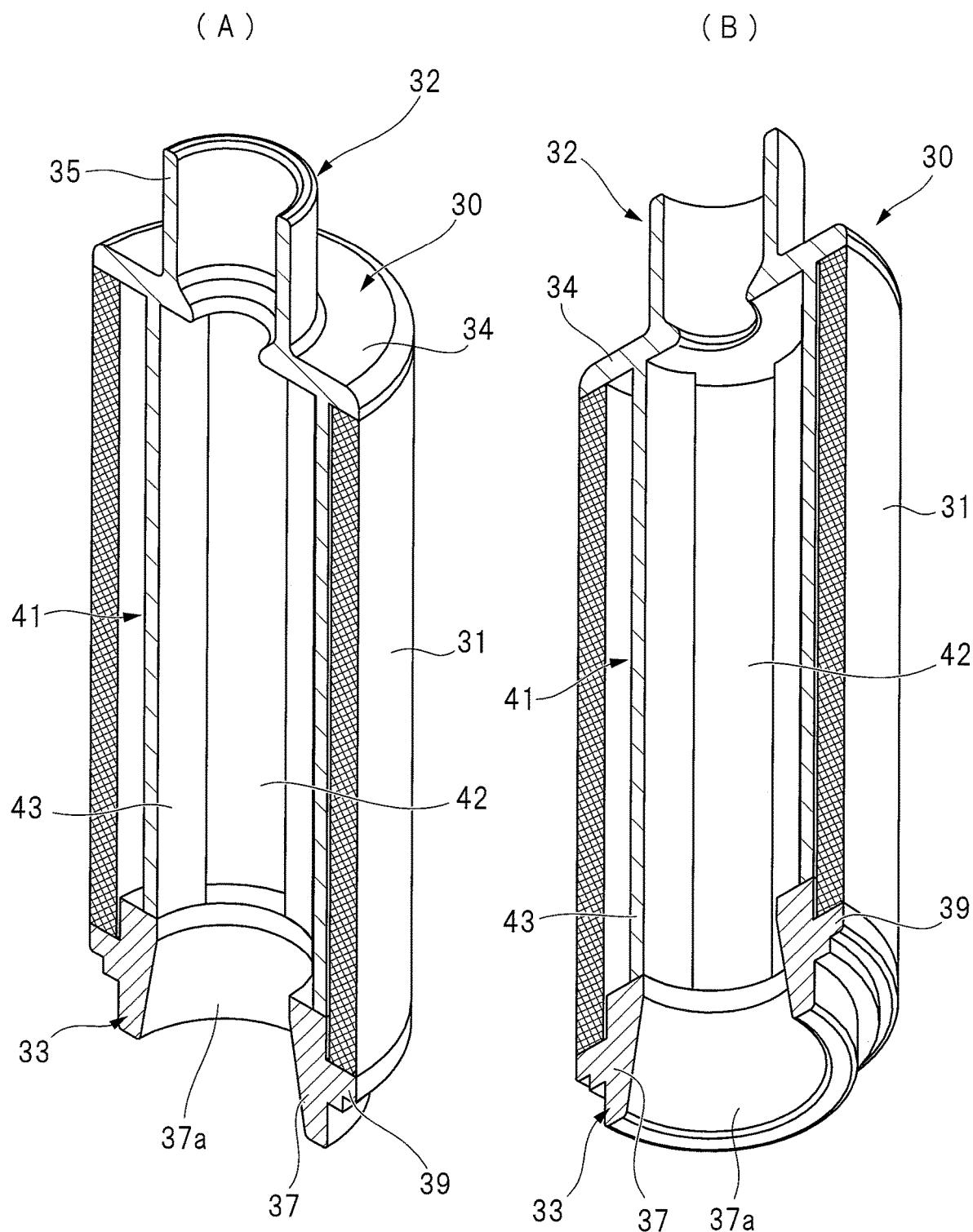
FIG. 6(A) is a perspective view showing a longitudinally-cut portion of the element assembly of FIG. 5, as seen from above.
FIG. 6(B) is a perspective view showing the longitudinally-cut portion of the element assembly of FIG. 6(A), as seen from below.

According to the filter 10 shown in FIGS. 5 and 6, the upper holder 32 is not provided with the small-diameter guide pipe 48 of FIGS. 1 and 2. Even if the structure is not provided with the small-diameter guide pipe 48, efficiency of removing foreign matters can be improved.

Figure 7:
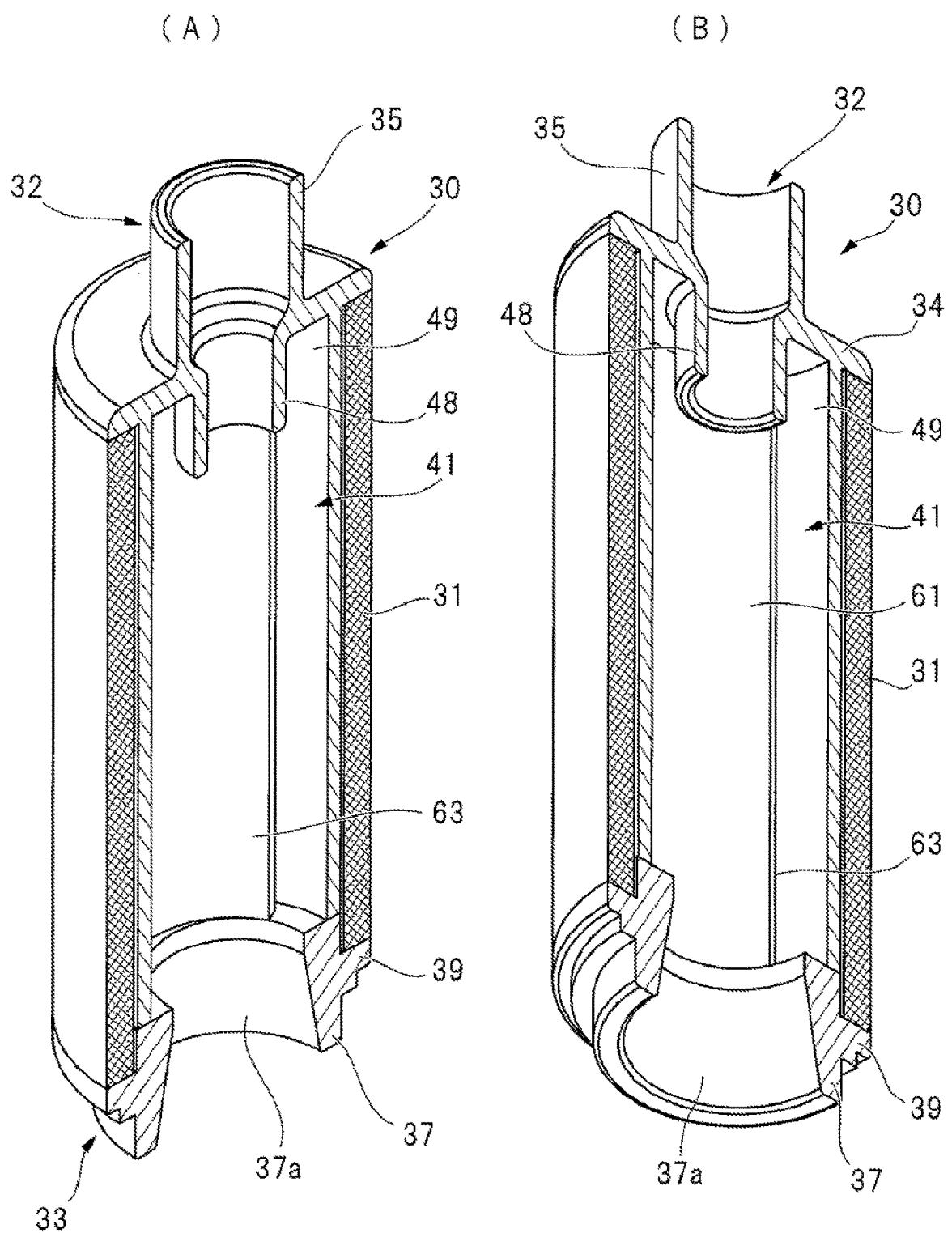
FIG. 7(A) is a perspective view showing a longitudinally-cut portion of another variant of the element assembly, as seen from above.
FIG. 7(B) is a perspective view showing the longitudinally-cut portion of the element assembly of FIG. 7(A), as seen from below.
Figure 8:
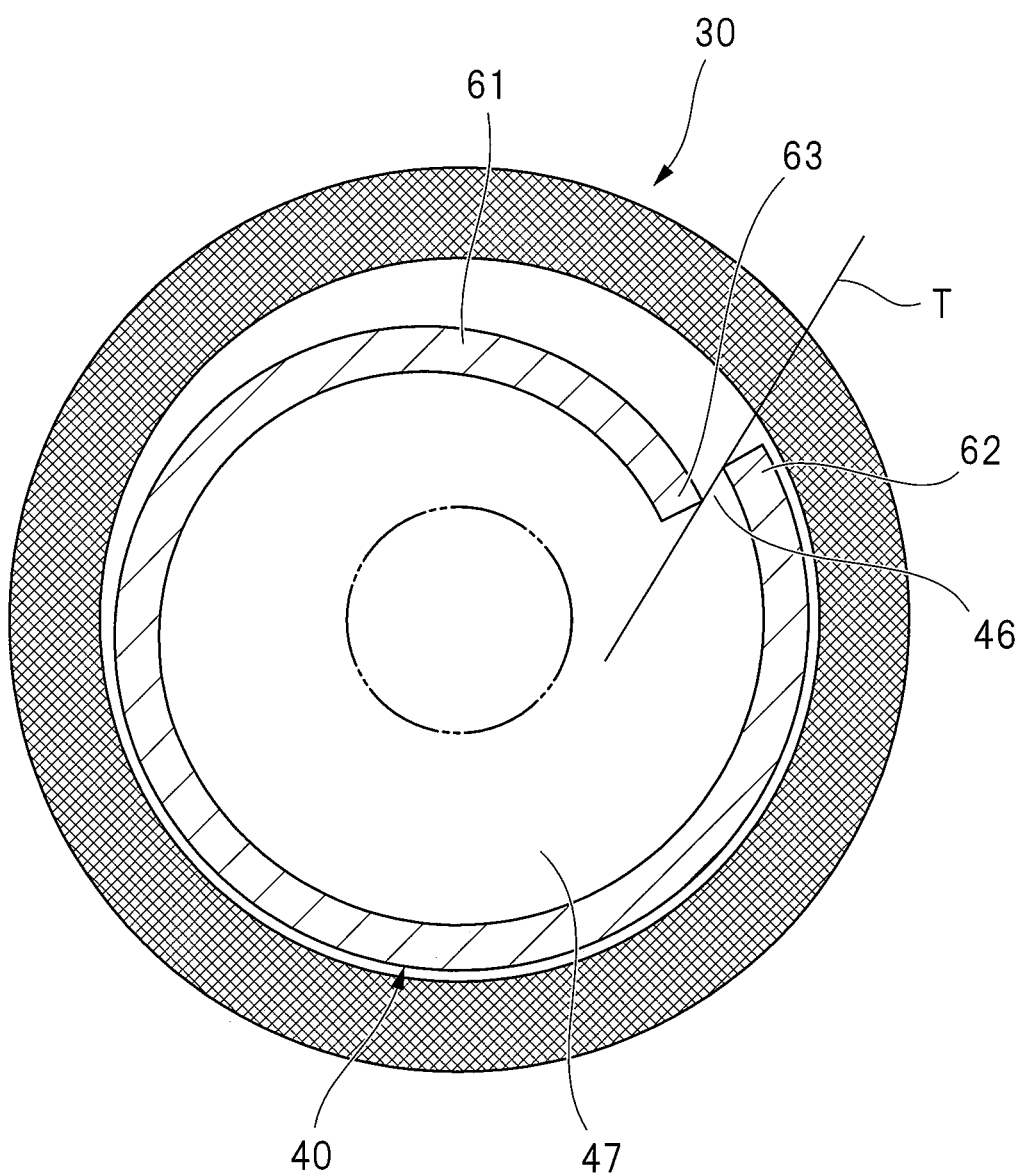
FIG. 8 is a lateral sectional view of the element assembly shown in FIG. 7.

FIG. 7(A) is a perspective view showing a longitudinally-cut portion of another variant of the element assembly 30, as seen from above; FIG. 7(B) is a perspective view showing the longitudinally-cut portion of the element assembly 30 of FIG. 7(A), as seen from below. FIG. 8 is a lateral sectional view of the element assembly 30 of FIG. 7, and FIG. 9 is a perspective view showing the air guide member 41 and the upper holder 32 for the element assembly 30 of FIG. 7.

Figure 9:
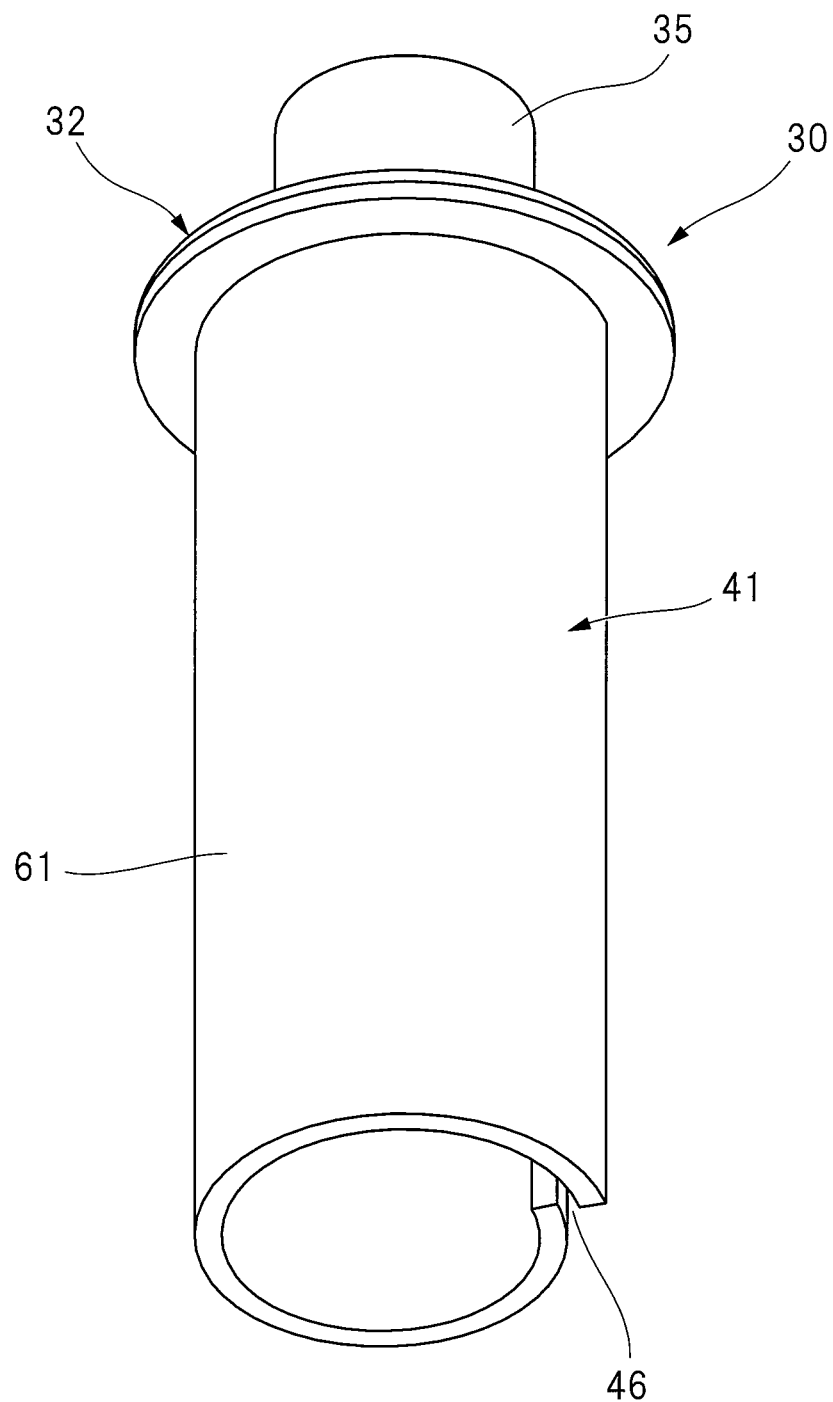
FIG. 9 is a perspective view showing an air guide member and an upper holder for the element assembly shown in FIG. 7.

According to the element assembly 30 of FIGS. 7 to 9, the air guide member 41 is formed of a single blade member 61 shaped spirally in the circumferential direction of the air guide member. The blade member 61 has end portions 62 and 63 in a circumferential direction of the blade member 61, and the slit 46 is formed between these end portions 62 and 63. Both end portions 62 and 63 overlap each other in the circumferential direction of the air guide member 41, with the slit 46 therebetween, and the slit 46 is opened toward the circumferential direction of the air guide member 41. The tangent line "T" from an edge of the outer end portion 62 extending through an edge of the inner end portion 63 does not pass through the center of the filter chamber 15b, that is, the center of the air guide member 41, as in the case of the air guide member 41 of FIG. 3. Specifically, the compressed air flows in the circumferential direction of the air guide member 41 into the inner space 47 through the slit 46, and does not flow directly toward the center of the inner space 47. As a result, the compressed air flowed into the inner space 47 through the slit 46 is jetted toward an inner surface of the blade member 61. The droplets flowed into the inner space 47 through the slit 46 adhere to the inner surface of the blade member 61, and thus, the droplets can be prevented from scattering toward the discharge pipe 35. Thus, efficiency of removal of foreign matters by the filter 10 can be improved.

As shown in FIG. 7, the upper holder 32 is provided with the small-diameter guide pipe 48. However, a structure in which the upper holder 32 is not provided with the small-diameter guide pipe 48 may also be incorporated in the filter, as shown in FIG. 4.

Figure 10:
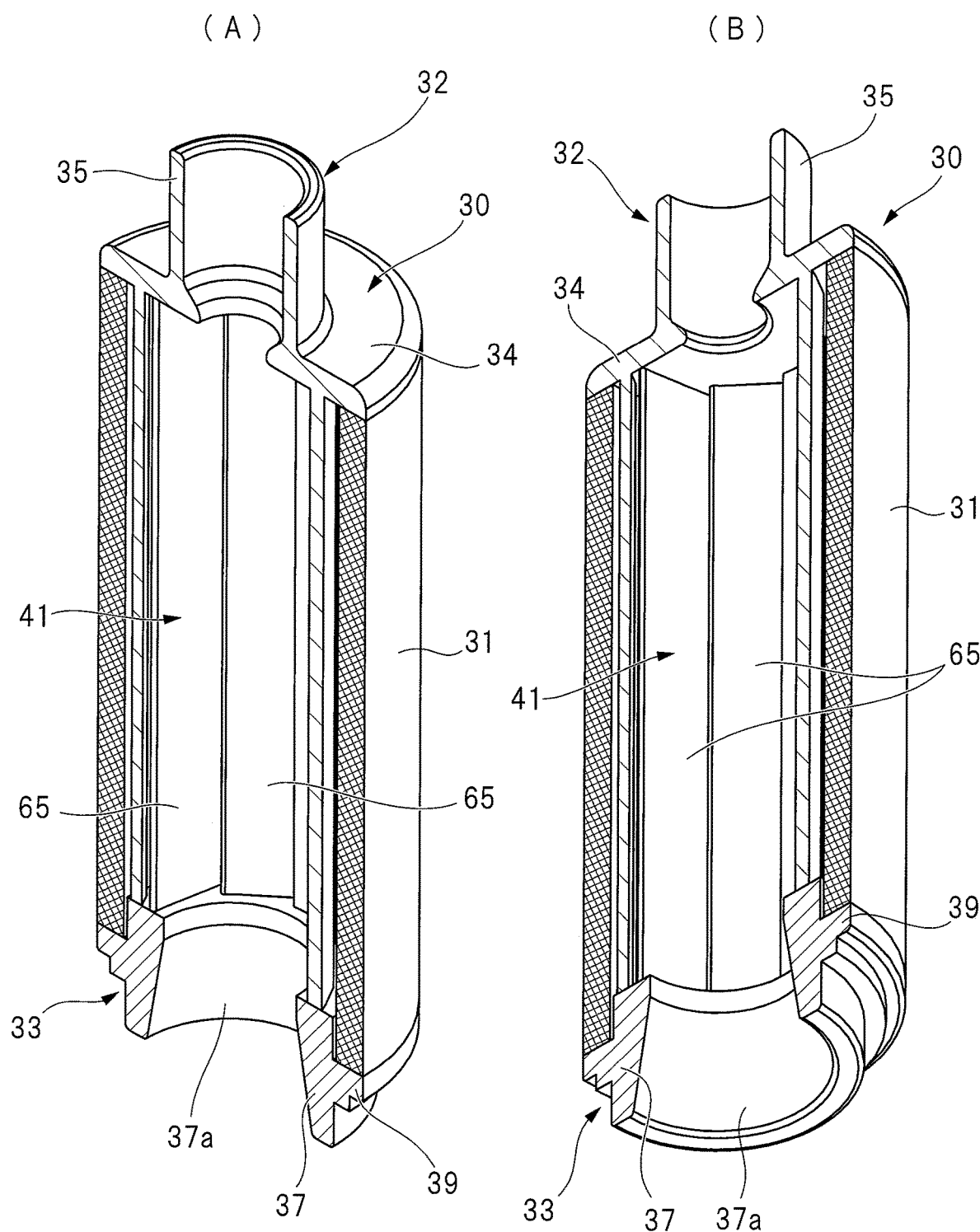
FIG. 10(A) is a perspective view showing a longitudinally-cut portion of yet another variant of the element assembly, as seen from above.
FIG. 10(B) is a perspective view showing the longitudinally-cut portion of the element assembly of FIG. 10(A), as seen from below.
Figure 11:
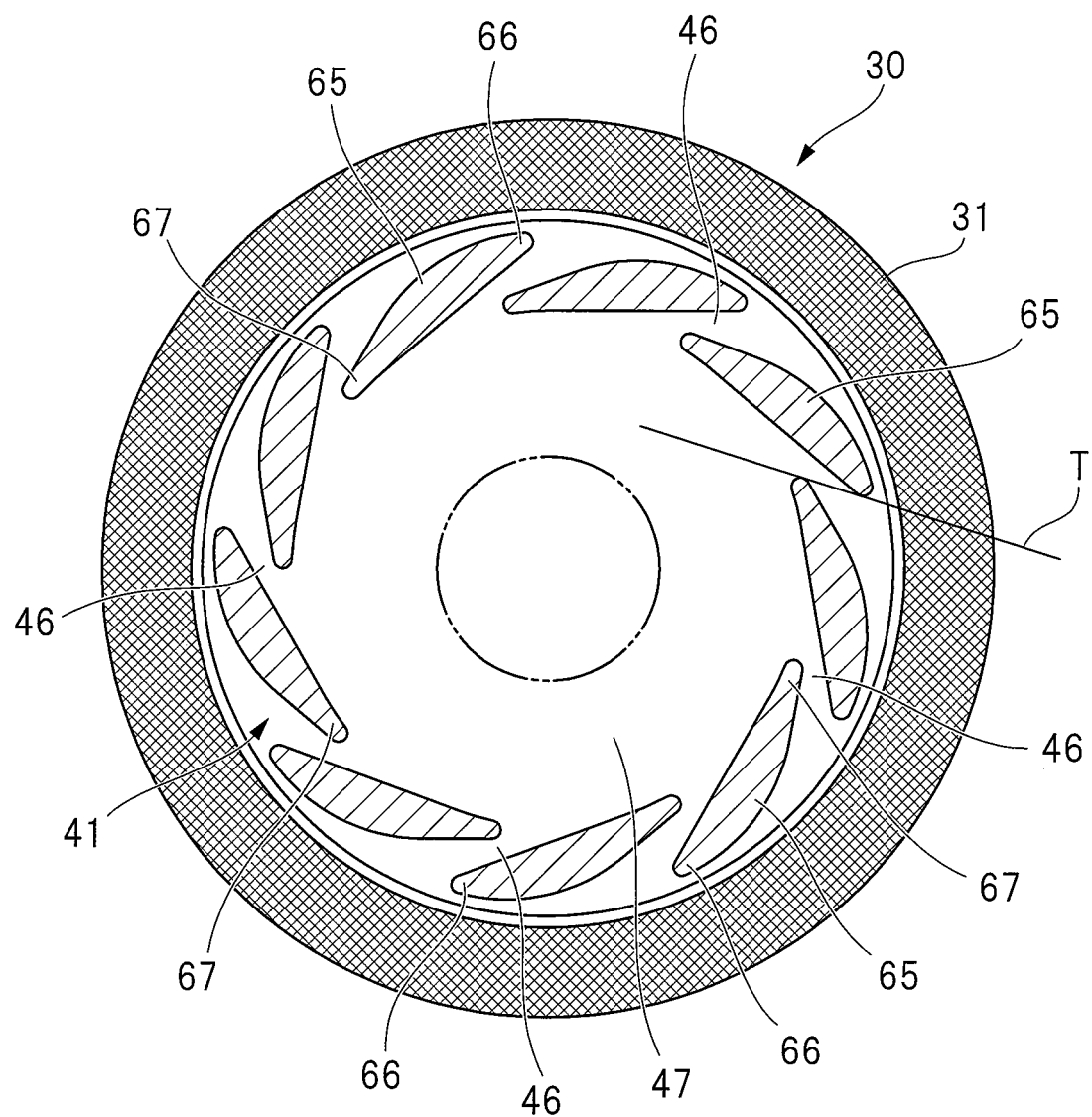
FIG. 11 is a lateral sectional view of the element assembly shown in FIG. 10.
Figure 12:
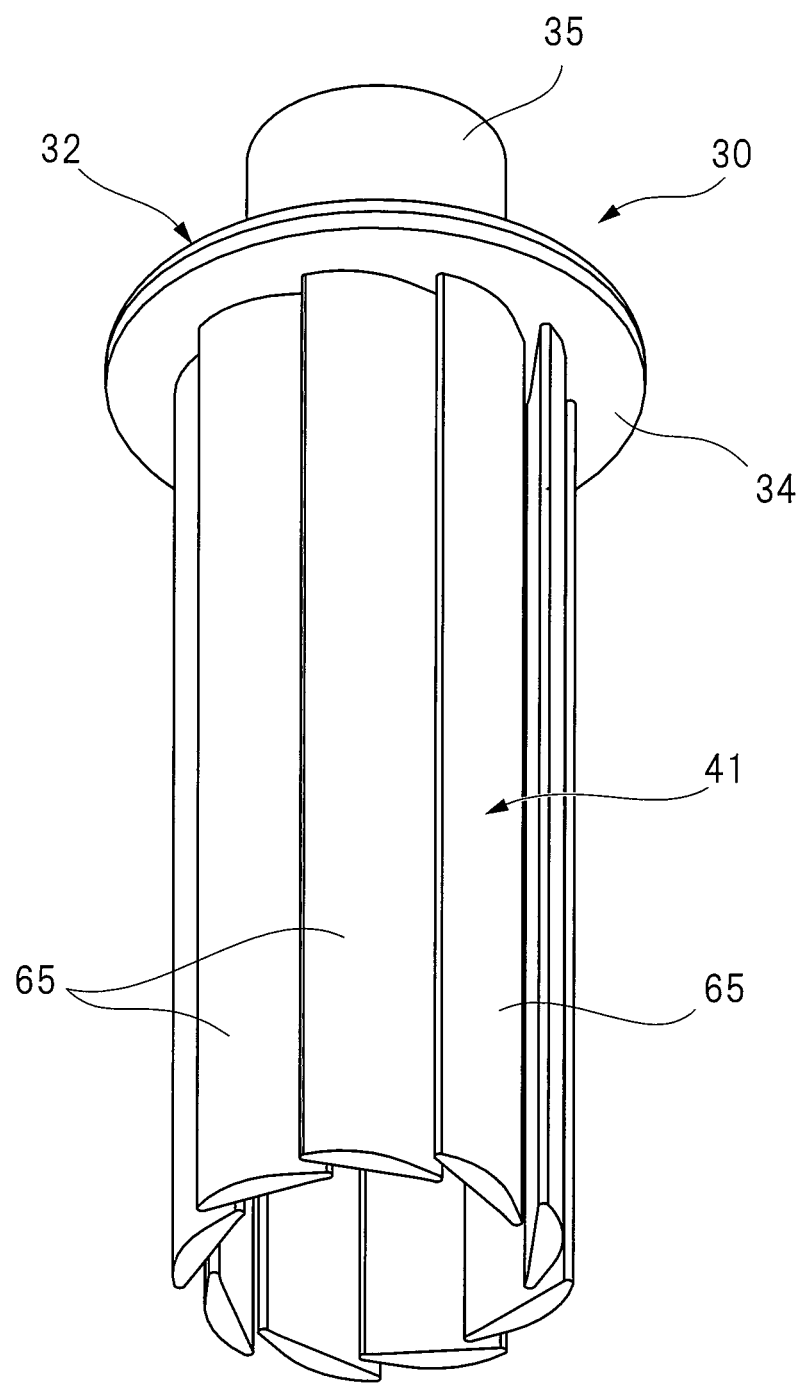
FIG. 12 is a perspective view showing an air guide member and an upper holder for the element assembly shown in FIG. 10.

FIG. 10(A) is a perspective view showing a longitudinally-cut portion of yet another variant of the element assembly, as seen from above; FIG. 10(B) is a perspective view showing the longitudinally-cut portion of the element assembly of FIG. 10(A), as seen from below. FIG. 11 is a lateral sectional view of the element assembly of FIG. 10. FIG. 12 is a perspective view of the air guide member and the upper holder for the element assembly of FIG. 10.

According to the element assembly 30 of FIGS. 10 to 12, the air guide member 41 is composed of a plurality of tilted blades 65 tilted in the circumferential direction of the air guide member 41. Each tilted blade 65 has an outer end portion 66 and an inner end portion 67 in a circumferential direction of the tilted blade 65. The inner end portion 67 is located radially inside relative to the outer end portion 66 of an adjacent tilted blade 65. A reference circle is defined by a circle with a circumference passing through center portions of each tilted blade 65. Each tilted blade 65 is tilted so that the outer end portion 66 is located outside of the reference circle, and the inner end portion 67 is located inside the reference circle. A slit 46 is formed between each inner end portion 67 of the tilted blades 65 and the outer end portion 66 of the adjacent tilted blade 65. Each slit 46 is opened in a direction along an inner surface of the respective tilted blade 65.

The droplets filtered through the filter element 31 and grown in size flow downward along an inside of the filter element 31. Most of the droplets detached from the inside of the filter element 31 without flowing downward collide against and adhere to outer walls of the tilted blades 65, and flow downward. The droplets that did not collide against the outer walls of the tilted blades 65 flow into the inner space 47 through the slits 46, are jetted toward the inner surfaces of the tilted blades 65 by the compressed air, and adhere to the inner surfaces of the tilted blades 65.

As in the case of the above-mentioned air guide member 41, the tangent line "T" from an edge of the outer end portion 66 extending through an edge of the inner end portion 67 does not pass through the center of the filter chamber 15b, that is, the center of the air guide member 41. Therefore, the compressed air flows in the circumferential direction of the air guide member 41 into the inner space 47 through the slits 46, and does not flow directly toward the center of the inner space 47. The compressed air is thus swirled within the inner space 47. Speed of the compressed air is increased by this swirling motion. The droplets contained in the compressed air collide against and adhere to the inner surfaces of the tilted blades 65 at a high speed. This increase in speed of the compressed air by the swirling motion improves efficiency of collision and adhesion of the droplets with respect to the inner surfaces of the tilted blades 65. The increase in speed causes more droplets to collide against and adhere to the inner surfaces of the tilted blades 65 and flow downward, and thus, the droplets can be prevented from flowing out toward the discharge pipe 35. In this manner, efficiency of removal of foreign matters by the filter 10 can be improved.

When the element assembly shown in FIGS. 8 to 12 is incorporated in the filter 10 of FIG. 1, the plurality of fins 59 are effective in the following manner. The compressed air flows into the storage chamber 15a through the liquid discharge hole 37a while being swirled, and is suppressed of its swirling by the fins 59. The compressed air suppressed of its swirling flows to a center portion of the air guide member 41 and toward the discharge pipe 35.

Figure 13:
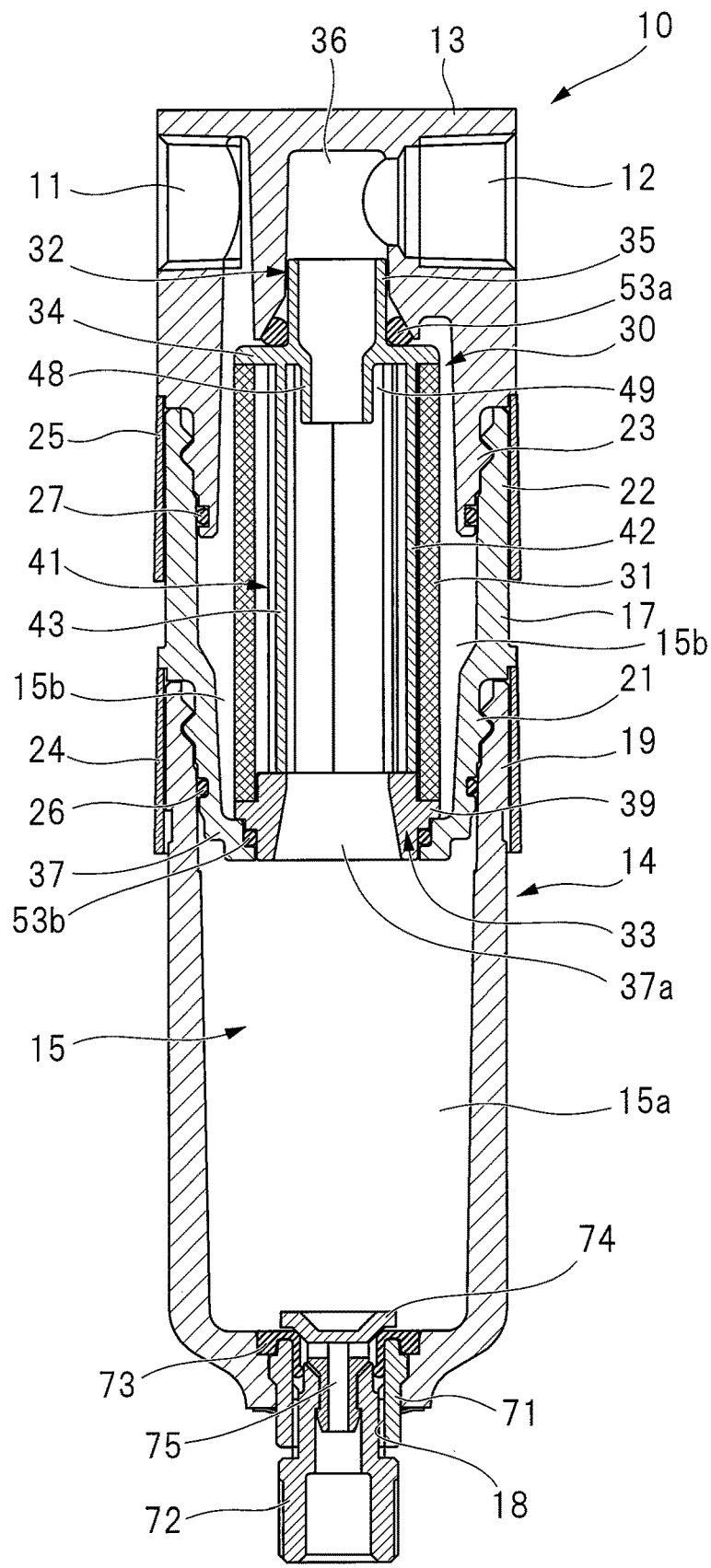
FIG. 13 is a longitudinal sectional view showing a filter according to another embodiment of the present invention.

FIG. 13 is a longitudinal sectional view showing another embodiment of the filter 10. The element assembly 30 in this filter 10 has the same structure as the element assembly 30 of FIGS. 1 to 4. The filter 10 shown in FIG. 13 is not provided with the leg portion 55 and the baffle plate 58 of FIG. 1. A sleeve 71 having the liquid discharge hole 18 is provided on a bottom portion of the filter container 14, and a discharge pipe 72 that serves as a drain cock is screwed to the sleeve 71. An opening/closing valve element 74 is engaged with the discharge pipe 72, and is operated to open and close a valve seat seal 73 provided on the filter container 14. The opening/closing valve element 74 is provided with a discharge hole 75, and when the discharge pipe 72 is rotated, the opening/closing valve element 74 can be moved up or down, so as to be switched between a state in which the discharge hole 75 and the storage chamber 15a are communicating with each other, and a state in which the discharge hole 75 and the storage chamber 15a are blocked from communicating with each other. Therefore, when the amount of liquid accumulated in the storage chamber 15a increases, the operator operates the discharge pipe 72 to discharge foreign matters, such as liquid, from the storage chamber 15a to the outside.

According to the above-mentioned embodiments, the air guide member 41 is integrally formed on the upper holder 32. However, the air guide member 41 may be integrally formed on the lower holder 33, or the air guide member 41 may be formed as an element separate from the upper and lower holders 32 and 33. Regardless of which of these structures is applied to the filter, the droplets grown into certain sizes, which contain liquid and oil agglomerated by being filtered through the filter element 31, flow downward along an inner surface of the filter element 31. The droplets detached from the inner surface of the filter element 31 are jetted toward the outer and inner surfaces of the air guide member 41, and therefore, the droplets adhere to the outer and inner surfaces of the air guide member 41, and flow downward. In this manner, foreign matters are prevented from being mixed with the compressed air flowing toward the outflow port 12.

The present invention is not to be limited to the above-mentioned embodiments, and various modifications can be made as far as they do not depart from the scope of the invention, which is defined by the appended claims. For example, the filters 10 shown in the figures are drain filters designed to discharge foreign matters, such as liquid, accumulated in the storage chamber 15a by manual operation. However, the invention may also be applied to a filter with an automatic drain mechanism designed to automatically discharge foreign matters when a predetermined amount is reached in the storage chamber 15a.

The present invention is applied to a pneumatic circuit that supplies compressed air from a pneumatic source to a pneumatic device, and is utilized in the pneumatic circuit for removing foreign matters contained in the compressed air.

Although various embodiments of the present invention have been described and shown, the invention is not restricted thereto, but may also be embodied in other ways within the scope of the subject-matter defined in the following claims.

What is claimed is:

1. A filter for removing foreign matters contained in compressed air to purify the compressed air, the filter comprising:
   a port block provided with: an inflow port to which compressed air is supplied; and an outflow port from which purified compressed air flows out;
   a filter container attached to the port block, the filter container and the port block collectively forming a housing chamber; and
   an element assembly disposed inside the housing chamber such that a space between an inner peripheral surface of the housing chamber and an outer peripheral surface of the element assembly is partitioned into an inflow space communicating with the inflow port and an inner space communicating with the outflow port,
   wherein the element assembly includes:
   a cylindrical filter element configured such that liquid components contained in the compressed air flowed from the inflow port and passed from outside the filter element to inside the filter element are agglomerated;
   an upper holder attached to the port block and being provided with a flange portion on which an upper end surface of the filter element abuts;
   a lower holder attached to the filter container and being provided with a flange portion on which a lower end surface of the filter element abuts;
   and
   an air guide member being provided between the upper holder and the lower holder, the air guide member extending along an inner peripheral surface of the filter element and being configured such that droplets formed by the agglomerated liquid components and detached from the inner peripheral surface of the filter element are allowed to flow downward,
   wherein the air guide member is provided with a slit that tilts a flow of the compressed air filtered through the filter element toward a circumferential direction of the air guide member so that the compressed air is guided to an inner surface of the air guide member, and
   after the compressed air flowed from the inflow port to the inflow space is filtered through the filter element and the droplets are separated from the compressed air, the compressed air flows into the inner space through the slit and flows out through the outflow port.

2. The filter according to claim 1, wherein
   the air guide member has:
   a plurality of outer blades positioned in the circumferential direction of the air guide member so as to be spaced apart from each other; and
   a plurality of inner blades positioned in the circumferential direction of the air guide member so as to be spaced apart from each other, the inner blades being positioned radially inside relative to the outer blades,
   wherein each outer blade has an outer end portion in a circumferential direction of the outer blade, each inner blade has an inner end portion in a circumferential direction of the inner blade, and the slit is formed between each outer end portion of the outer blade and the inner end portion of the inner blade adjacent to said outer blade in a radial direction of the air guide member.

3. The filter according to claim 1, wherein
the air guide member is formed of a single blade member shaped spirally in the circumferential direction of the air guide member, the blade member having two end portions; and
the slit is formed between the two end portions of the blade member.

4. The filter according to claim 1, wherein
the air guide member has a plurality of tilted blades tilted in the circumferential direction of the air guide member;
each tilted blade has an inner end portion in a circumferential direction of the tilted blade and an outer end portion in the circumferential direction of the tilted blade; and
the slit is formed between the inner end portion of each tilted blade and the outer end portion of the tilted blade adjacent to said inner end portion.

5. The filter according to claim 1, wherein
a small-diameter guide pipe for guiding the compressed air that passed through the slit is provided on the upper holder and is positioned inside the air guide member.

6. The filter according to claim 1, wherein
the air guide member is integrally provided on the upper holder.

7. The filter according to claim 1, wherein
the filter container has:
a first container provided with a storage chamber; and
a second container disposed between the first container and the port block so as to partition a filter chamber, the lower holder being attached to the second container.

8. An element assembly utilized in a filter that removes foreign matters contained in compressed air to purify the compressed air, the element assembly comprising:
a cylindrical filter element configured such that liquid components contained in the compressed air flowed from outside the filter element to inside the filter element are agglomerated;
an upper holder attached to the port block and being provided with a flange portion on which an upper end surface of the filter element abuts;
a lower holder attached to the filter container and being provided with a flange portion on which a lower end surface of the filter element abuts; and
an air guide member provided between the upper holder and the lower holder, the air guide member extending along an inner peripheral surface of the filter element and being configured such that droplets formed by the agglomerated liquid components and detached from the inner peripheral surface of the filter element are allowed to flow downward,
wherein the air guide member is provided with a slit that tilts a flow of the compressed air filtered through the filter element toward a circumferential direction of the air guide member so that the compressed air is guided to an inner surface of the air guide member.

9. The element assembly according to claim 8, wherein
the air guide member has:
a plurality of outer blades positioned in the circumferential direction of the air guide member so as to be spaced apart from each other; and
a plurality of inner blades positioned in the circumferential direction of the air guide member so as to be spaced apart from each other, the inner blades being positioned radially inside relative to the outer blades,
wherein each outer blade has an outer end portion in a circumferential direction of the outer blade, each inner blade has an inner end portion in a circumferential direction of the inner blade, and the slit is formed between each outer end portion of the outer blade and the inner end portion of the inner blade adjacent to said outer blade in a radial direction of the air guide member.

10. The element assembly according to claim 8, wherein
the air guide member is formed of a single blade member shaped spirally in the circumferential direction of the air guide member, the blade member having two end portions; and
the slit is formed between the two end portions of the blade member.

11. The element assembly according to claim 8, wherein
the air guide member has a plurality of tilted blades tilted in the circumferential direction of the air guide member;
each tilted blade has an inner end portion in a circumferential direction of the tilted blade and an outer end portion in the circumferential direction of the tilted blade; and
the slit is formed between the inner end portion of each tilted blade and the outer end portion of the tilted blade adjacent to said inner end portion.

12. The element assembly according to claim 8, wherein
a small-diameter guide pipe for guiding the compressed air that passed through the slit is provide on the upper holder and is positioned inside the air guide member.

13. The element assembly according to claim 8, wherein
the air guide member is integrally provided on the upper holder.

* * * * *